US011830283B2

(12) United States Patent
Dukhon

(10) Patent No.: US 11,830,283 B2
(45) Date of Patent: Nov. 28, 2023

(54) APPARATUS AND METHOD FOR BIOMETRIC CONTROL OF A SET TOP BOX

(71) Applicant: ARRIS Enterprises LLC, Suwanee, GA (US)

(72) Inventor: Alexander Dukhon, Richboro, PA (US)

(73) Assignee: ARRIS Enterprises LLC, Suwanee, GA (US)

(*) Notice: Subject to any disclaimer, the term of this patent is extended or adjusted under 35 U.S.C. 154(b) by 0 days.

(21) Appl. No.: 17/388,087

(22) Filed: Jul. 29, 2021

(65) Prior Publication Data

US 2022/0036039 A1 Feb. 3, 2022

Related U.S. Application Data

(60) Provisional application No. 63/058,603, filed on Jul. 30, 2020.

(51) Int. Cl.
*G06V 40/12* (2022.01)
*H04N 21/4415* (2011.01)
(Continued)

(52) U.S. Cl.
CPC ......... *G06V 40/1365* (2022.01); *G06N 3/02* (2013.01); *H04N 21/4222* (2013.01);
(Continued)

(58) Field of Classification Search
CPC .. G06V 40/1365; G06N 3/02; H04N 21/4222; H04N 21/4415; H04N 21/4532; H04N 21/4666
See application file for complete search history.

(56) References Cited

U.S. PATENT DOCUMENTS 7,165,098 B1* 1/2007 Boyer ............... H04N 21/4782
  709/219
8,640,021 B2* 1/2014 Perez ............... G06Q 30/0631
  715/203
(Continued)

FOREIGN PATENT DOCUMENTS

KR 10-2014-0090847 A 7/2014

OTHER PUBLICATIONS

Notification of Transmittal of the International Search Report (Forms PCT/ISA/220 and PCT/ISA/210) and the Written Opinion of the International Searching Authority (Form PCT/ISA/237) dated Nov. 10, 2021, by the International Application Division Korean Intellectual Property Office in corresponding International Application No. PCT/US2021/043676. (11 pages).
(Continued)

*Primary Examiner* — Fernando Alcon
(74) *Attorney, Agent, or Firm* — Panitch Schwarze Belisario & Nadel LLC

(57) ABSTRACT

Exemplary embodiments are directed to an apparatus dedicated to controlling a specified multimedia device for viewing programming content. The apparatus has an input interface configured for capturing a fingerprint of a user. The apparatus also includes memory for storing a plurality of user identification files. Each user identification file including data associated with at least one reference fingerprint of a respective user. A processor compares the captured fingerprint with at least one reference fingerprint stored in memory, and generates a control signal based on a result of the comparison. The control signal can include user profile identifier associated with the captured fingerprint and command data for instructing the multimedia device to generate a customized or default user interface for the identified user
(Continued)

to view or access programming content. The control signal is transmitted to a multimedia device.

25 Claims, 9 Drawing Sheets

(51) Int. Cl.
*G06N 3/02* (2006.01)
*H04N 21/422* (2011.01)
*H04N 21/466* (2011.01)
*H04N 21/45* (2011.01)

(52) U.S. Cl.
CPC ..... *H04N 21/4415* (2013.01); *H04N 21/4532* (2013.01); *H04N 21/4666* (2013.01)

(56) References Cited

U.S. PATENT DOCUMENTS

| | | | | |
|---|---|---|---|---|
| 8,698,900 | B1* | 4/2014 | Tang | H04N 21/42204 717/124 |
| 9,116,645 | B1* | 8/2015 | Klappert | H04N 21/4415 |
| 9,519,909 | B2* | 12/2016 | Nielsen | H04H 60/45 |
| 10,244,988 | B2* | 4/2019 | Kangas | A61B 5/7296 |
| 10,248,231 | B2* | 4/2019 | Tian | H04M 1/67 |
| 10,405,034 | B1* | 9/2019 | Nijim | H04N 21/25883 |
| 10,452,410 | B2* | 10/2019 | Arar | G06F 3/0484 |
| 2002/0059588 | A1* | 5/2002 | Huber | H04N 7/163 348/E5.103 |
| 2003/0108227 | A1* | 6/2003 | Philomin | H04N 5/44582 382/124 |
| 2003/0179229 | A1* | 9/2003 | Van Erlach | H04M 1/724 715/744 |
| 2005/0160458 | A1* | 7/2005 | Baumgartner | H04H 60/46 348/E7.071 |
| 2006/0104224 | A1* | 5/2006 | Singh | G07C 9/37 370/310 |
| 2007/0103712 | A1* | 5/2007 | Corona | G03G 15/502 358/1.14 |
| 2008/0059884 | A1* | 3/2008 | Ellis | H04N 21/458 715/721 |
| 2008/0244671 | A1* | 10/2008 | Moon | H04N 21/4316 348/E5.002 |
| 2009/0146779 | A1* | 6/2009 | Kumar | H04N 21/43615 340/5.31 |
| 2010/0083371 | A1* | 4/2010 | Bennetts | H04N 21/4751 726/19 |
| 2010/0146278 | A1* | 6/2010 | Maier | H04N 5/4403 713/171 |
| 2010/0223660 | A1* | 9/2010 | Scott | H04N 21/2541 726/4 |
| 2011/0068897 | A1* | 3/2011 | Yum | H04N 21/42204 340/5.83 |
| 2012/0314140 | A1 | 12/2012 | Wiser et al. | |
| 2013/0086608 | A1 | 4/2013 | Slaney et al. | |
| 2013/0104203 | A1* | 4/2013 | Davis | H04L 63/0861 726/5 |
| 2013/0147705 | A1 | 6/2013 | Lee et al. | |
| 2013/0276030 | A1* | 10/2013 | Fujimoto | H04N 21/482 725/40 |
| 2014/0053189 | A1 | 2/2014 | Lee et al. | |
| 2014/0196075 | A1 | 7/2014 | Park | |
| 2014/0294259 | A1* | 10/2014 | Lee | G06F 21/32 382/124 |
| 2015/0150053 | A1* | 5/2015 | Hardin | H04N 21/4823 725/52 |
| 2016/0014457 | A1* | 1/2016 | Dua | H04L 29/06027 725/25 |
| 2016/0182950 | A1* | 6/2016 | Robinson | H04N 21/4532 725/28 |
| 2016/0241904 | A1* | 8/2016 | Ushimaru | H04N 21/482 |
| 2018/0338178 | A1* | 11/2018 | Richman | G10L 17/04 |
| 2019/0191214 | A1* | 6/2019 | Mandavilli | H04N 21/42203 |
| 2019/0324610 | A1* | 10/2019 | Green | G06F 8/38 |
| 2020/0196007 | A1* | 6/2020 | Choi | H04N 21/4402 |
| 2021/0289248 | A1* | 9/2021 | Prabhu | H04N 21/4147 |
| 2022/0103886 | A1* | 3/2022 | Srigiri | H04N 7/163 |
| 2022/0321635 | A1* | 10/2022 | Simukka | H04N 21/258 |

OTHER PUBLICATIONS

Int'l Preliminary Report on Patentability dated Feb. 9, 2023 in Int'l Application No. PCT/US2021/043676.

* cited by examiner

APPARATUS AND METHOD FOR BIOMETRIC CONTROL OF A SET TOP BOX

FIELD

The present disclosure relates to a remote control unit having a fingerprint scanner for controlling a set top box.

BACKGROUND

Multimedia devices such as a set-top box allows a user to access content for viewing. It is desirable for an MSO to identify who is viewing media content and when. Users can use a remote control device to activate the set-top box, navigate to the desired media content, and alter settings with respect to the user or subscriber account. For security, users are often prompted to identify themselves through a pin code and/or username/password combination. In addition, biometric technology such as facial recognition or voice recognition technology can be used to authorize access to a smart device and/or a multimedia device. Users may be apprehensive, however, to use such technology for fear of providing the MSO or nefarious actor an ability to monitor the home or locale by obtaining unauthorized access or control of the camera or microphone through the network. A need exists to use biometric technology, such as a fingerprint, for more than just device or account access or authorization, but to initiate command and control operations for a multimedia or content provider device to view programming content and manage the viewing experience.

SUMMARY

An exemplary remote control device, comprising: an input interface configured for capturing a fingerprint of a user; memory for storing: program code for controlling a specified content provider apparatus, and a plurality of user identification files, each user identification file including data associated with a reference fingerprint of a user; a remote control processor configured to compare the captured fingerprint with at least one reference fingerprint stored in memory, the remote control processor executing the program code to generate a control signal based on a result of the comparison, wherein: when the captured fingerprint matches the at least one reference fingerprint, the control signal includes at least a user profile identifier associated with the captured fingerprint and command data for instructing the multimedia device to generate a customized user interface for the identified user; and when the captured fingerprint does not match the at least one reference fingerprint, the control signal includes command data for instructing the multimedia device to generate a default user interface; and a remote control transmitter configured for transmitting the control signal to a multimedia device.

An exemplary method for generating a customized user interface, comprising: executing, by a processing device of the remote control unit, program code dedicated for controlling a specified multimedia device; capturing, via a fingerprint scanner of a remote control unit, a fingerprint of a user; comparing, by a processing device of the remote control unit, the captured fingerprint with at least one reference fingerprint stored in memory; generating, by the processing device of the remote control unit, a control signal based on the executed program code and as a result of the comparison, wherein: when the captured fingerprint matches the at least one reference fingerprint, the control signal includes at least a user profile identifier associated with the captured fingerprint and command data for instructing the multimedia device to generate a customized user interface for the identified user; and when the captured fingerprint does not match the at least one reference fingerprint, the control signal includes command data for instructing the multimedia device to generate a default user interface; and transmitting, via a transmitting device of the control unit, the control signal to a multimedia device.

DETAILED DESCRIPTION

Figure 1:
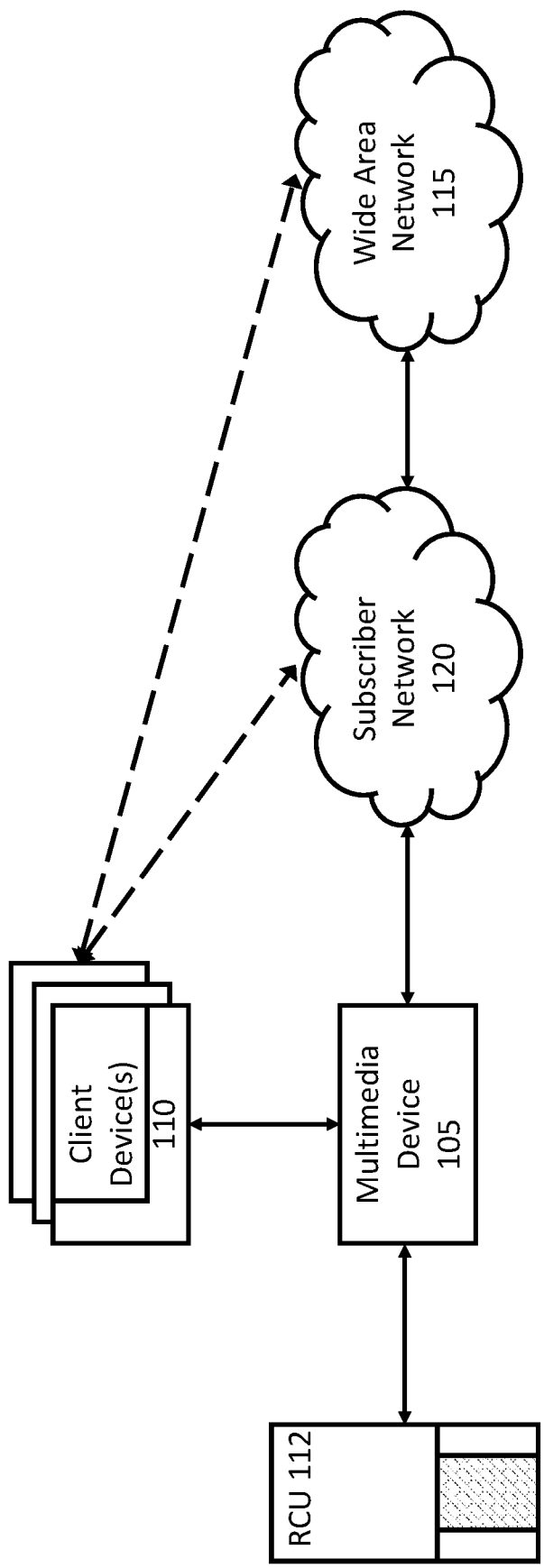
FIG. 1 is a block diagram illustrating a network environment operable to facilitate the generation and utilization of one or more customized user profiles in a multimedia device in accordance with an exemplary embodiment of the present disclosure.

FIG. 1 is a block diagram illustrating a network environment 100 operable to facilitate the generation and utilization of one or more customized user profiles in a multimedia device in accordance with an exemplary embodiment of the present disclosure. In embodiments, one or more multimedia devices 105 (e.g., set-top box (STB), multimedia gateway device, DLNA multimedia device, etc.) may provide video, data and/or voice services to one or more client devices 110 by communicating with a wide area network (WAN) 115 through a connection to a subscriber network 120 (e.g., a local area network (LAN), a wireless local area network (WLAN), a personal area network (PAN), mobile network, high-speed wireless network, etc.). For example, a subscriber can receive and request video, data and/or voice services through a variety of types of client devices 110, including but not limited to a television, computer, tablet, mobile device, STB, and others. It should be understood that a multimedia device 105 may communicate directly with, and receive one or more services directly from a subscriber network 120 or WAN 115. A client device 110 may receive the requested services through a connection to a multimedia device 105, through a direct connection to a subscriber network 120 (e.g., mobile network), through a direct connection to a WAN 115, or through a connection to a local network 125 that is provided by a multimedia device 105 or other access point within an associated locale. While the components shown in FIG. 1 are shown separate from each other, it should be understood that the various components can be integrated into each other.

In some embodiments, a multimedia device 105 may be configured to generate a default user interface when the multimedia device 105 is booted up, or otherwise when a user activates or interacts with the multimedia device 105 via a connected or dedicated control device such as a remote control unit (RCU) 112 or a client device 110. The RCU 112 can be used to generate or access customized user interfaces on the multimedia device 105 based on a user's identity. The RCU 112 can communicate control or command signals to the multimedia device 105, which the multimedia device 105 can use to access a specific user profile and generate a custom user interface based on viewing behavior and/or viewing preferences obtained from the specific user profile.

Figure 2:
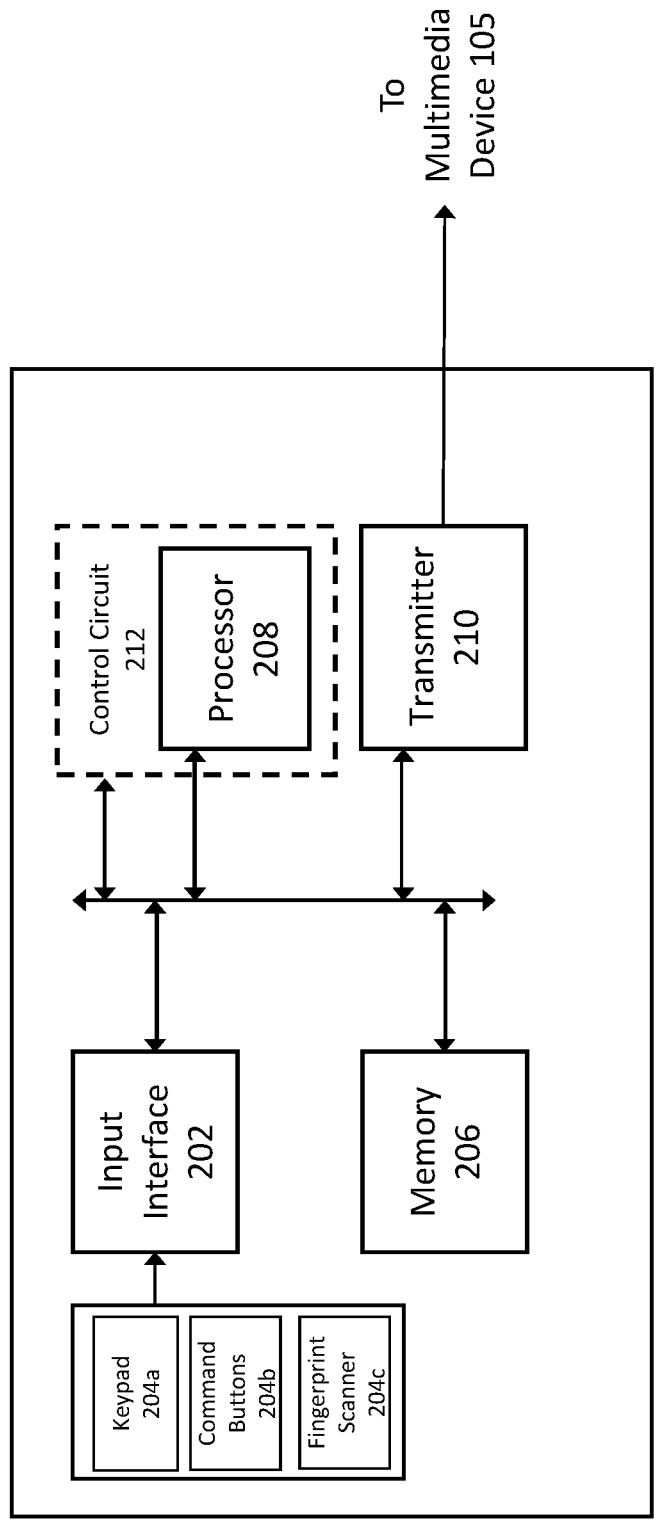
FIG. 2 illustrates a block diagram of a remote control unit (RCU) in accordance with an exemplary embodiment of the present disclosure.

FIG. 2 illustrates a block diagram of an RCU 112 in accordance with an exemplary embodiment of the present disclosure. As shown in FIG. 2, the RCU 112 can include an input interface 202 configured to receive an input from a user. The input interface 202 can include can any number or combination of input components 204 such as a keypad 204a having alphanumeric characters and command keys for generating signals to control and/or communicate with the multimedia device 105. According to an exemplary embodiment, the input components 204 can include one or more command buttons 204b which are within or separate from the keypad and which generate commands for accessing desired media content and settings and/or options of the multimedia device 105. The input components 204 can also include a fingerprint scanner 204c for capturing a fingerprint of the user. The fingerprint scanner can include a light-sensitive microchip, such as a CCD, charge-coupled device, or a CMOS image sensor, which are configured to produce a digital image or digital data based on the fingerprint of a user. According to an exemplary embodiment, the RCU 112 can include one or more fingerprint scanners 204c, which are located at one or more strategic positions on a housing of the RCU 112. The input components 204 can also be integrated into a touch screen of a display device (e.g., output interface), which can also display prompts, status information, alerts, and other information or data to the user as desired. The input components 204 various types of input means for accommodating special needs of a user. According to an exemplary embodiment, the fingerprint scanner 204c is not used in combination with other biometric input devices such as a camera or microphone as these latter devices can provide increased security risk of unauthorized monitoring of the user or the user's locale. The RCU 112 can also include memory 206 for storing a plurality of user identification files. Each user identification file can include a dataset of various information related to a specific user profile or user account. For example, the dataset can include a user identification number, a pin code, a password, or any other data as desired. According to an exemplary embodiment, the dataset can include a digital image or digital data of a reference fingerprint of a respective user. The memory can also be configured to store program code (e.g., application software or firmware) which allow the RCU 112 to perform various operations for controlling and/or interacting specifically with the multimedia device 105. According to an exemplary embodiment, the RCU 112 can include a control circuit 212 including the processor 202, which executes firmware for initiating various operations of the control circuit 212 and controlling the control circuit 212 to generate wireless signals for output to the multimedia device 105. According to another exemplary embodiment, the processor 202 can execute the program code associated with an application program for a computing device such as a smartphone, tablet computer, laptop computer, desktop computer, or other suitable computing device as desired. As will be described in further detail, the execution of the program code causes the various computing devices to operate as a remote control unit dedicated for controlling the operation of a specified multimedia device 105.

The RCU 112 can include a processor 208 which can be configured to access one or more software or program code and/or modules stored in the memory for generating a control or data signal for the multimedia device 105 in response to an input of a user. For example, according to an exemplary embodiment the processor 208 can be configured to compare the captured fingerprint with at least one reference fingerprint stored in memory 206. The processor 208 generates a control signal based on a result of the comparison. For example, when the captured fingerprint matches the at least one reference fingerprint, the processor 208 selects a user profile identifier provided in the user identification data and generates a control signal which includes the user profile identifier and command data for instructing the multimedia device 105 to generate a customized user interface for the identified user. According to an exemplary embodiment, the processor 208 can include other identifying information in the control signal such as a pin code, user identifier or identification number, and/or a password and any other identifying information of the user as desired. When the captured fingerprint does not match the at least one reference fingerprint, the control signal includes command data for instructing the multimedia device to generate a default user interface. The RCU 112 can include a transmitter 210 for wirelessly transmitting commands and control signals, which can include the user profile identifier, to the multimedia device 105. For example, the RCU 112 can be configured to generate a series of radio-frequency pulses, such as a plurality of infrared signal pulses that are digitally-coded with data to control functions such as power, volume, channels, playback, settings, or any other configurable or adjustable features as desired. The transmitter 210 can include a light emitting diode (LED) such as an infrared diode, for emitting a beam of light toward the multimedia device 105. According to an exemplary embodiment, the infrared radiation can be transmitted at a wavelength of 940 nm, or any other suitable wavelength as desired.

According to an exemplary embodiment, the control circuit 212 of the RCU 112 can be configured to generate command and/or control signals for the multimedia device according to any one of various radio frequency and/or infrared transmission protocols such as RC-5, RC-6, R-Step, and TC101. According to yet another exemplary embodiment, the processor executing of program code of an application program can generate and communicate command and/or control signals over various wireless communication technologies and protocols such as: Bluetooth Audio Video Remote Control Profile (AVRCP), ZigBee Radio Frequency for Consumer Electronics (RF4CE), and Z-Wave. According to an exemplary embodiment, the transmitter 210 can be integrated into a transceiver device, which provides both send and receive capabilities with the multimedia device 105, client devices 110, and any other external or remote device as desired. The RCU 112 and/or the control circuit 212 can be configured to include any additional transmitter, receiver, or transceiver devices for communicating with other devices including the multimedia device 105 and client devices 110 over the local network or WiFi.

The RCU 112 can be used to initiate the generation of one or more user profiles for accessing content through the multimedia device 105. The user can be prompted via a combination of the user interface of the RCU 112 and the multimedia device 105 to input information for uniquely identifying a user. When the user inputs the identifying information, the RCU 112 can store the information in memory. The RCU 112 can also generate a data signal which includes or identifies user identifying information, such as a user identifier, pin code, username, password, etc. for transmission to the multimedia device 105 for creating or updating a user profile. According to an exemplary embodiment, the data signal can include digital data representing the fingerprint of a user generated by the fingerprint scanner. According to an exemplary embodiment, one of the plurality of user profiles can be an administrative profile. The administrative profile can have authorizations or permissions to control configurable parameters of the multimedia device, settings of the content provider account, and/or settings of other user profiles. Various settings can be associated with each user profile. For example, a user profile can be used to access media content on one or more other multimedia devices connected to the subscriber network. Still further, the RCU 112 can be used to generate a single common user profile for access by all users. Each user profile and/or the administrative profile can also allow the setting of hardware and/or display preferences, such as, the activation/deactivation of closed captioning, selection/connection of wireless output devices (speakers, headphones, earpieces, etc.), setting of audio levels or audio mixing, setting of audio balance between speakers, headphones, and/or earpieces, content fast forwarding or rewind speed or skip lengths, or any other desired hardware setting, content output setting, or other controllable or adjustable setting which influences a user's experience as desired.

When a user profile is initiated by using the fingerprint scanner of the RCU 112, the RCU 112 can transmit a command, control, and/or data signal that is digitally encoded with the fingerprint data to the multimedia device 105 using an infrared protocol. According to an exemplary embodiment, the RCU 112 can be configured to compare the fingerprint information obtained through the fingerprint scanner with the data of one or more reference fingerprints in the user identification files stored in the memory 206. Based on a result of the comparison, the RCU 112 can generate and transmit a data signal digitally encoded with an identity of the user to the multimedia device 105. According to another exemplary embodiment, the RCU 112 can capture the fingerprint of the user and transmit the digital representation of the fingerprint to the multimedia device 105 where the process for identifying the user is performed. According to an exemplary embodiment, a user profile can have a plurality of reference fingerprints. For example, each reference fingerprint can be associated with or used to initiate a specific function or operation of the RCU 112. In one example, matching a fingerprint associated with the index finger can cause the RCU 112 to generate a data signal which causes the multimedia device 105 to display a menu or interface for selecting content for viewing. In another example, matching a fingerprint associated with the ring finger can cause the processor 102 to generate a data signal for displaying a menu or interface for selecting/setting hardware preferences. According to yet another embodiment, the RCU 112 can include a plurality of fingerprint scanners 204c. Each fingerprint scanner 204c being used to initiate one or more specified functions of the RCU 112 or to initiate one or more different operations of a specified multimedia device 105 as already discussed. According to a further embodiment, each fingerprint scanner can be configured to accept one or more fingers of the user to initiate the functions or control operations as desired. Each fingerprint can be associated with a different user profile, so that one person can have more than one user profile that controls content presentation (e.g., preferred content types and targeted messaging) and/or hardware (e.g., CC, Bluetooth earpieces, preferred volume such as balance between earpiece and speaker volume, forward and reverse skip lengths, etc.) according to user preferences.

According to yet another exemplary embodiment, a fingerprint captured via the RCU 112 can be used for initiating a transaction for the purchase of content, such as video-on-demand (VOD) or pay-per-view (PPV) content from a broadcaster or service provider. In addition, the transaction can include accepting or declining contract terms associated with a broadcaster or service provider or opting-in or -out of programming or content offers, or any other type of transaction that can be conducted by a user as desired. In other embodiments, a fingerprint captured via the RCU 112 can be used to verify a user's identity for participation in an online poll or study. These operations and features of these exemplary embodiments are available to those subscribers or users who have either registered their fingerprint information for display of a customized user interface or for account verification and/or configuration purposes.

For example, for the purchase of items or content offers from a broadcaster or content provider a the user can be prompted, via one or more screens or windows of the user interface or in association with content viewable or being viewed on a selected channel, to initiate or confirm the purchase of an item or content, confirm participation in an online study or poll, or accept or decline the programming offers, changes, or service agreements using at least one of the input components 204. The user may then be prompted to verify their identity using the fingerprint scanner of the RCU 112 to capture their respective fingerprint. The RCU 112 can compare the digital representation of the captured fingerprint to reference fingerprint information stored in memory 206. Based on a result of the comparison, the RCU 112 can generate a control signal, which includes either validating or invalidating information with regard to whether the selected transaction can be completed. If a match to the captured fingerprint information is not found, then the processor 208 of the RCU 112 generates an invalidating control signal to prevent or deny completion of the transaction. Alternatively, if a match is found, the control signal includes validating information confirming the identity of the user and allowing the selected transaction to be completed. The RCU 112 sends the control signal to the multimedia device 105 to control or manage completion of the transaction. According to an exemplary embodiment, the RCU 112 can send the captured fingerprint information to the multimedia device 105 using an infrared transmission protocol. The multimedia device 105 can then determine whether completion of the transaction will be permitted. According to another exemplary embodiment, the multimedia device 105 can send the received fingerprint information to a remote processing device over the subscriber network 120 or WAN 115, such as a processing server of a content provider for authentication or verification of the user's identity.

Figure 3:
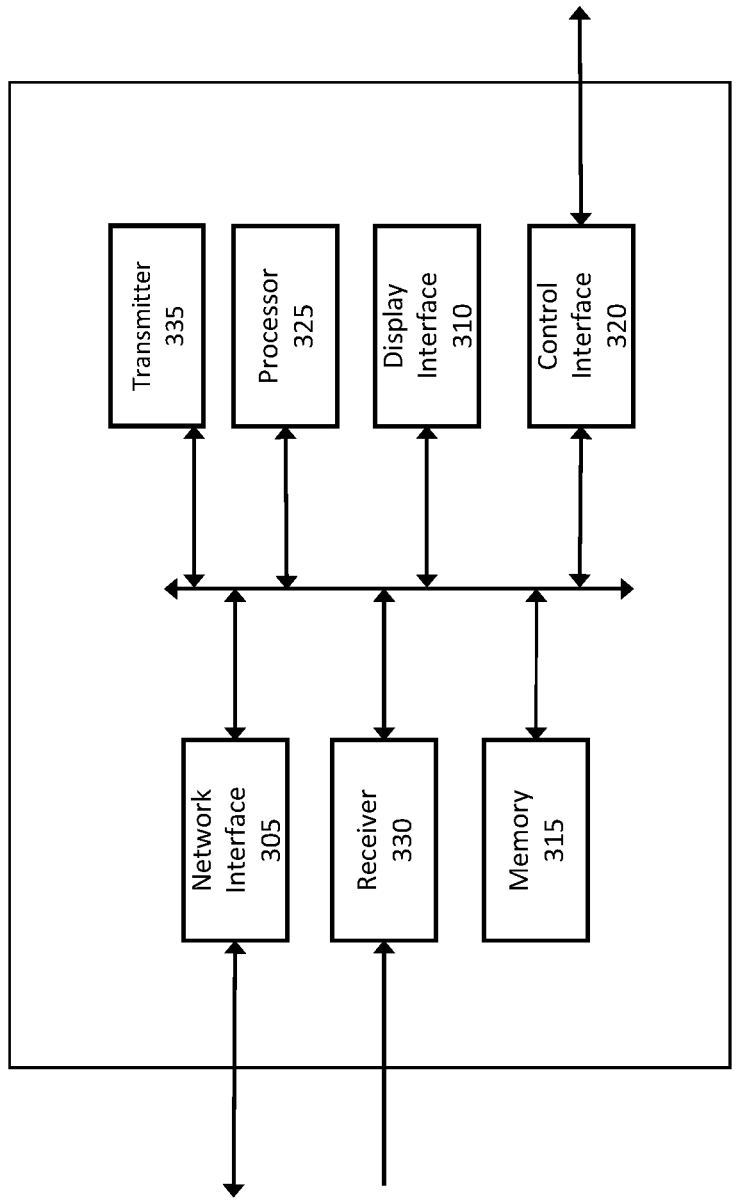
FIG. 3 is a block diagram illustrating a multimedia device in accordance with an exemplary embodiment of the present disclosure.

FIG. 3 is a block diagram illustrating a multimedia device 105 in accordance with an exemplary embodiment of the present disclosure. The multimedia device 105 may be a STB, or any other device configured to output a communication to a multimedia device 105. The multimedia device 105 may include a network interface 305, a display interface 310, a memory 315, and a control interface 320, a processor 325, and a receiver 330.

The multimedia device 105 can receive a command, control, and/or data signal via the receiver 330. The receiver 330 can include one or more components, circuitry, and/or program code for receiving data signals over any number of communication protocols. For example, the receiver 330 can include an intermittent oscillation detection circuit or a super heterodyne tuned to receive a data signal communicated by the RCU 112 according to an infrared transmission protocol. The processor 325 can extract information from the data signal, such as the user profile identifier. Using the extracted information, the processor 225 can generate a query for selecting a user profile associated with the user profile identifier of the identified user. From the selected user profile, the processor 225 can obtain at least one of a viewing history and viewing preference information provided in the user profile of the identified user. The processor 225 can also monitor and record channel or tuning requests for a predetermined duration of time (e.g., five (5) to seven (7) days) in association with the accessed user profile. At the end of the predetermined duration of time, the multimedia device 105 may aggregate information associated with one or more monitored channels or tuning requests to compile a profile channel list in association with the accessed user profile. The recorded and aggregated information can be stored in an external or remote data repository, such as an external memory device, a cloud database, and/or a storage location on the network. The profile channel list may include identifiers of channels that were frequently tuned to or otherwise output by the multimedia device 105 during the predetermined duration of time. The user may use the acquired information to generate a customized user interface for presenting and/or recommending content such as channels, shows, or movies to a specified user through the accessed user profile. According to an exemplary embodiment, the process of monitoring channels and tuning requests to generate the customized user interface can be executed through a neural network configured to perform a machine learning process based on viewing and tuning behavior of the specified user over time. According to an exemplary embodiment, the monitored channels and tuning requests can be used to identify one or more advertisements for sending to a client device associated with the user or user profile.

According to exemplary embodiments of the present disclosure, after the default profile and channel list is initially created, the profile and channel list may be updated when new channels are tuned to by an associated user. The multimedia device 105 may be configured with a threshold to prevent transient channel changes from impacting the channel list. For example, the multimedia device 105 may monitor the frequency at which certain channels are requested and/or viewed by a user and may add to the channel list only those channels that are determined to have been requested or viewed at a frequency higher than a threshold. The multimedia device 105 may remove channels from a channel list when the channel has not been requested or viewed by a user for a certain duration of time after being added to the channel list.

According to embodiments of the present disclosure, the multimedia device 105 may associate a default user profile and profile channel list with all users of the multimedia device 105, an individual user, or a subset of users. The multimedia device 105 may associate the default user profile and profile channel list with a user that requested the channel changes consolidated into the profile channel list, or a user may be prompted by the multimedia device 105 to name the default user profile and profile channel list to indicate a specific user (e.g., "Mom," "Dad," "Child," etc.) to be associated with the profile and channel list. Parental or administrative control settings may be used to prevent certain channels from being added to a channel list associated with a certain user.

According to an exemplary embodiment of the present disclosure, the multimedia device 105 may be configured to automatically, or in response to a user request, enable profile-based viewing. While profile based viewing is enabled, the multimedia device 105 may respond to channel change requests (e.g., "channel up," "channel down," etc.) by tuning or otherwise outputting only those channels that are included within a profile channel list of a default profile. While profile based viewing is enabled, the multimedia device 105 may respond to a program information request (e.g., guide request) by compiling program information associated with only those channels included within a profile channel list of a default profile, and the compiled program information may be output to a display device as a guide showing only those channels within the profile channel list. It should be understood that a user may disable profile based viewing to view channels that are not included in a profile channel list.

According to another exemplary embodiment, one of the plurality of user profiles is an administrative profile. The administrative profile having permissions to set and/or adjust configurable parameters associated multimedia device and/or user account. For example, the administrative profile can be used to set parental controls for controlling the type of content which can be accessed through one or more other user profiles.

According to exemplary embodiments of the present disclosure, video, voice, and/or data services may be delivered to the multimedia device 105. The multimedia device (e.g., content provider device) 105 may include a television, mobile device, tablet, computer, set-top box (STB), gaming device, access points (APs), and any other device operable to receive video, voice, and/or data services and configured to receive command, control, and/or data signals from the RCU 112. It should be understood that various services may be delivered to the multimedia device 105, including but not limited to, live or broadcast television, video-on-demand (VoD) content, pay-per view content, recorded content (e.g., DVR content), audio-only content, streaming content such as YouTube or Netflix content, and other various video, data, and/or voice services. It should be further understood that the devices shown in FIG. 1 may be integrated. For example, a television or other display device may be connected to and receive content from a STB.

The multimedia device 105 can be connected to receive multiple services and communicate with other multimedia devices 105 and/or client devices over the local network 110. The local network 110 may include a local area network (LAN), wireless local area network (WLAN), personal area network (PAN), mobile hotspot network, and others. The local network 110 may be provided at a subscriber premise by a central device. The central device may include a gateway device, modem device, combination thereof or other access device. It will be appreciated by those skilled in the relevant art that delivery of the multiple services over the local network may be accomplished using a variety of communication protocols, standards, and formats, and that the multimedia device 105 may be capable of interacting and communicating with each other and/or with a central device over various wireless communication standards (e.g., Wi-Fi, Zigbee, Bluetooth, etc.) or wired communication standards (e.g., Ethernet, Multimedia over Coax Alliance (MoCA), etc.).

In embodiments, multiple services (e.g., video, voice, and/or data services) may be delivered from a wide-area network (WAN) 115 to the local network through a connection to a subscriber network 120. The subscriber network 120 may include an optical network, hybrid fiber coaxial (HFC) network, twisted-pair, mobile network, high-speed data network, satellite network, and others.

It should be understood that multiple profiles and channel lists may be stored at the multimedia device 105, and each profile and/or channel list may be associated with a specific user or plurality of users. A viewer may select which user profile or channel list is to be used while a session utilizing profile based viewing is ongoing, and the multimedia device 105 may provide a profile based viewing session using the profile and/or channel list associated with the selected user to respond to channel change and program information requests.

In embodiments, the multimedia device 105 may be configured to generate a temporal based channel profile. The multimedia device 105 may maintain a list of channels viewed by a specific user or by a specific device along with the time (e.g., time of day, day of week, etc.) at which the channel was viewed. While a temporal based channel viewing feature is enabled at the multimedia device 105, the multimedia device 105 may autonomously switch or may prompt the user to switch to a certain channel based on a current time matching up with a time at which the certain channel is frequently viewed by the user. For example, if a certain channel is viewed frequently at a certain day/time by a particular user, the multimedia device 105 may autonomously, or upon a user response from an output prompt, bookmark an association between the channel and the certain day/time.

Figure 4:
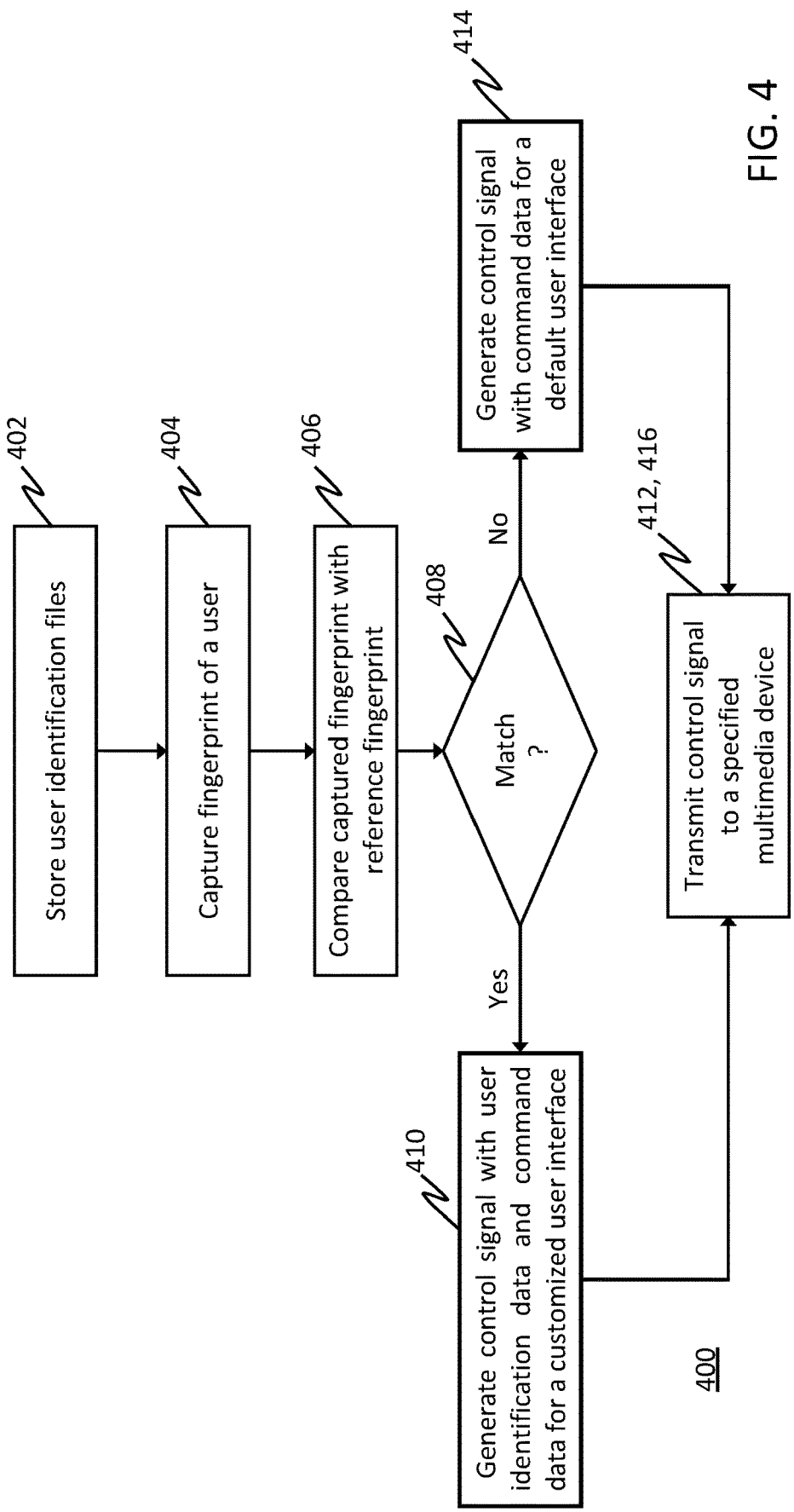
FIG. 4 is a flowchart illustrating a method for accessing a customized user interface via an RCU in accordance with an exemplary embodiment.

FIG. 4 is a flowchart illustrating a method 400 for accessing a customized user interface of a multimedia device 105 via a dedicated RCU 112 in accordance with an exemplary embodiment. The method 400 involves storing, in a memory device of the RCU 112, one or more user identification files (step 402). One or more of the user identification files includes digital data representing a reference fingerprint of a user. The fingerprint scanner of the remote control unit is used in capturing a fingerprint of a user (step 404). The method 400 further includes comparing, in the processor 208 of the RCU 112, the captured fingerprint with at least one reference fingerprint stored in memory 206 (steps 406, 408). A step 410 includes generating, in the processing device of the RCU 112, a control signal based on a result of the comparison. when the captured fingerprint matches the at least one reference fingerprint, the processor 208 selects a user profile identifier associated with the matching reference fingerprint and generates the control signal, which includes the user profile identifier and command data for instructing the multimedia device to generate a customized user interface for the identified user (Step 412). On the other hand, when the captured fingerprint does not match the at least one reference fingerprint stored in the memory 206 of the RCU 112, no user identifying data is selected and the control signal includes command data for instructing the multimedia device to generate a default user interface (Step 414). Step 416 of the method 400 involves transmitting, via the transmitter 210 device of the RCU 112, the control signal to a multimedia device 105 according to an infrared transmission protocol.

Figure 5:
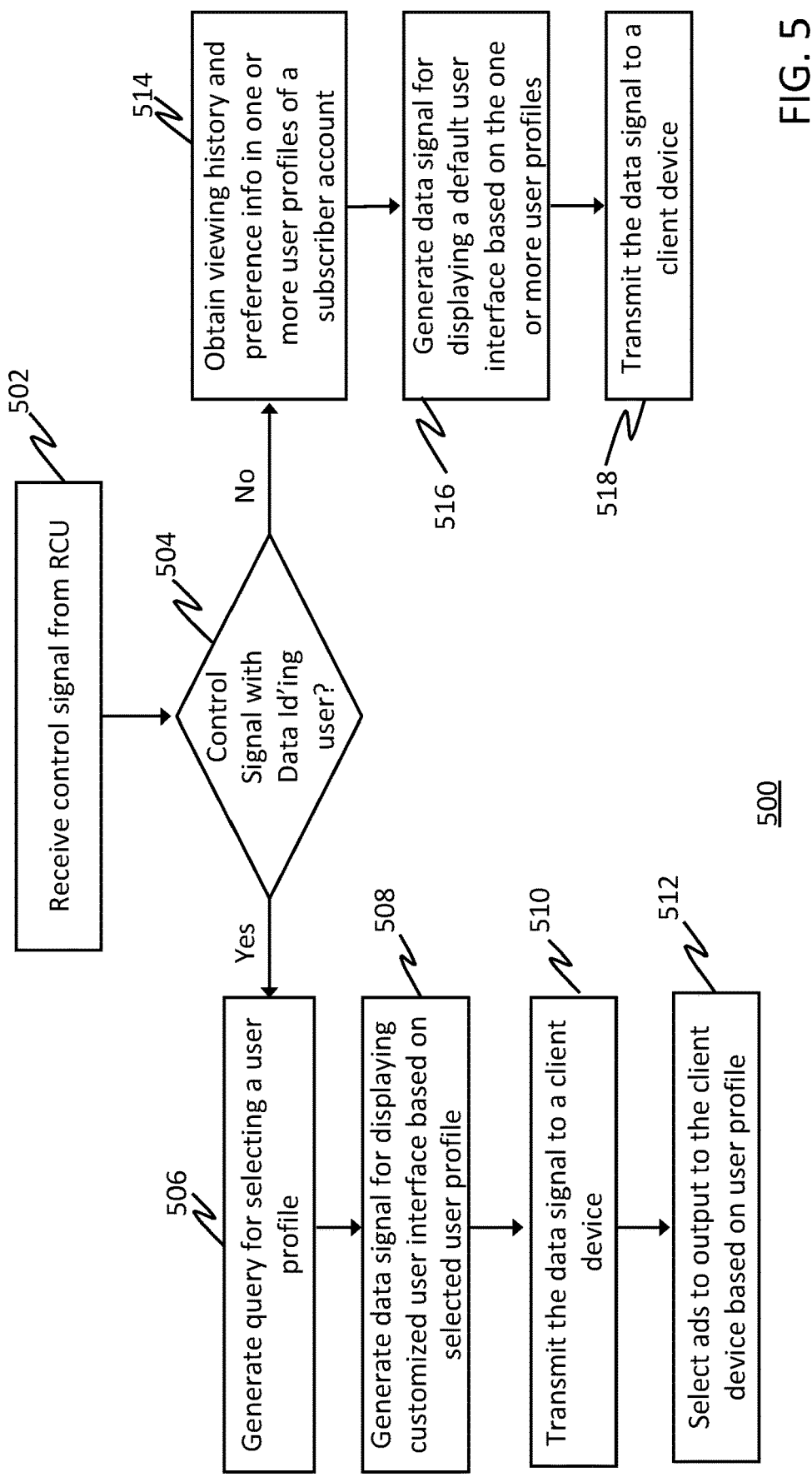
FIG. 5 is a flowchart illustrating a method for accessing a customized user interface via a multimedia device in accordance with an exemplary embodiment.

FIG. 5 is a flowchart illustrating a method 500 for accessing a customized user interface via a multimedia device in accordance with an exemplary embodiment.

Step 502 of the method 500 involves receiving, in a receiving unit of a multimedia device 105, the control signal from the dedicated RCU 112 according to infrared suitable communication protocol (e.g., RF, Bluetooth, WiFi, etc.). The method 500 further includes determining, in a processor of the multimedia device 105, whether the control signal includes data identifying a user (step 504). When the control signal includes data identifying a user, such as a user profile identifier, the processor of the multimedia device 105 continues by generating, in the processor of the multimedia device 105, a first query for selecting a user profile associated with the user profile identifier in the control signal (step 506). The method 500 further includes generating, in the processor of the multimedia device 105, a data signal for displaying a customized interface based on at least one of the viewing history and the preference information provided in the selected user profile of the identified user (step 508). A transmitting device (e.g., transmitter) 335 of the multimedia device 105 is used for transmitting the data signal for displaying a customized interface to a client device of the identified user (step 510). The method also includes, selecting, by the processor 325 of the multimedia device, one or more advertisements to output to a client device based on at least one of the viewing history and the preference information provided in the user profile of the identified user (step 512). Turning again to step 504, when the control signal includes a command signal for generating a default user interface, the processor 325 continues method 500 by selecting one or more user profiles associated with a common subscriber account and obtaining at least one of the viewing history and the preference information provided in the one or more selected user profiles (step 514). The processor 325 continues the method by generating a data signal for displaying a default user interface based on the obtained viewing history and preference information of the one or more selected user profiles (step 516). The transmitting device 335 of the multimedia device is used for transmitting to a client device, the data signal for displaying the default user interface (step 518).

Figure 6:
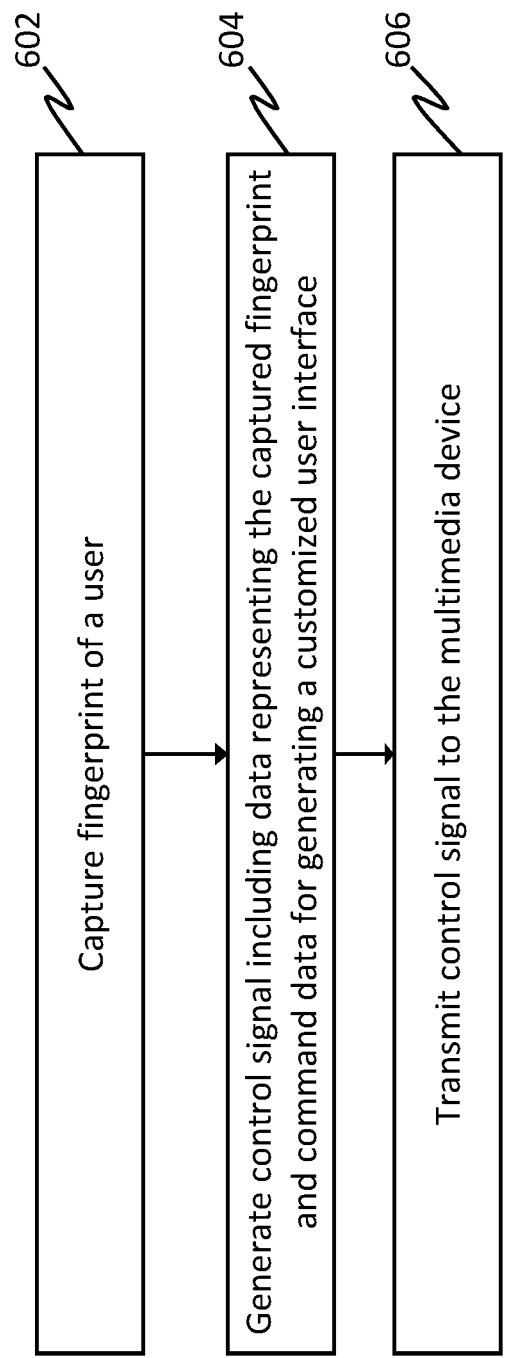
FIG. 6 is a flowchart illustrating a method for accessing a customized user interface via an RCU in accordance with an exemplary embodiment.

FIG. 6 is a flowchart illustrating a method 400 for accessing a customized user interface via an RCU 112 in accordance with an exemplary embodiment. In step 602 of the method 600 involves capturing a fingerprint of a user. The method 600 further includes generating, in the processor 208 of the RCU 112, a control signal including data representing the captured fingerprint and command data for instructing the multimedia device 105 to generate a customized user interface for a user associated with the captured fingerprint (Step 604). Step 606 of the method 600 involves transmitting, via the transmitter 210 of the RCU 112, the control signal to a multimedia device 105 according to an infrared transmission protocol.

Figure 7:
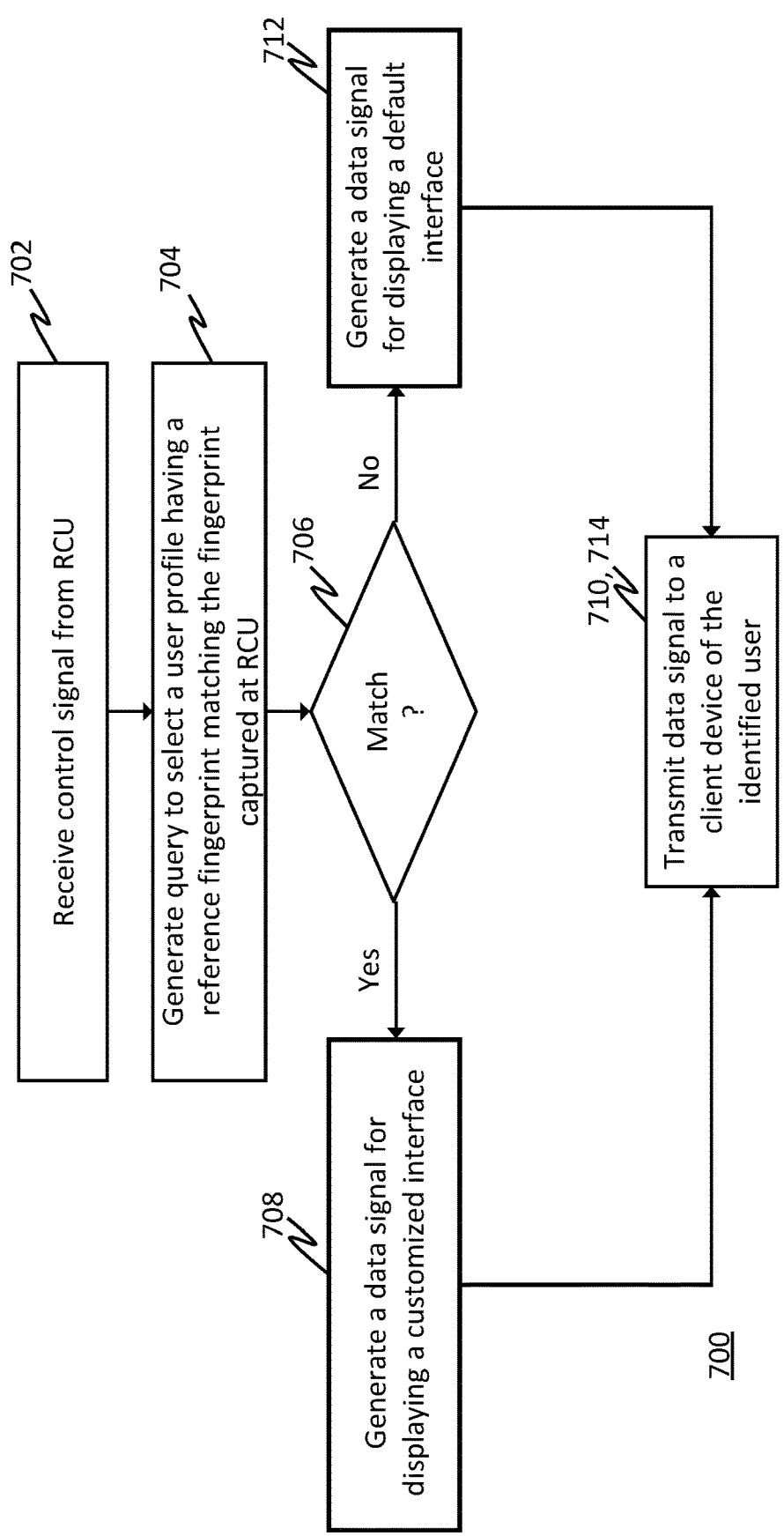
FIG. 7 is a flowchart illustrating a method for accessing a generating a user interface via a multimedia device in accordance with an exemplary embodiment.

FIG. 7 is a flowchart illustrating a method 700 for accessing a generating a user interface via a multimedia device in accordance with an exemplary embodiment.

Step 702 involves receiving, in a receiver 330 of a multimedia device 105, the control signal from the RCU 112 according to transmission suitable communication protocol. The method 700 further includes generating, in the processor 325 of the multimedia device 105, a query to compare the captured fingerprint with at least one reference fingerprint stored in memory 315 or a remote or external database (steps 704, 706). The memory 315 or external database can store one or more user profiles which include among other information, data representing a reference fingerprint of a respective user. When the captured fingerprint matches a reference fingerprint stored in the one or more user profiles, the processor 325 selects the user profile associated with matching reference fingerprint (Step 706). Step 708 involves the processor 325 generating a data signal for displaying a customized interface based on at least one of the viewing history and the preference information provided in the selected user profile. The multimedia device 105 performs step 708, which includes of transmitting the data signal to a client device 115 of the user using one of the network interface 305 and the display interface 310 as desired. Returning to Steps 704, 706, when the captured fingerprint does not return a match when compared against the plurality of reference fingerprints, the processor 325 can select one or more user profiles for obtaining viewing history and preference information (Step 710). The processor 325 then performs the step of generating a data signal for displaying a default interface based on at least one of the viewing history and the preference information provided in the one or more selected user profiles (step 712). Step 714 involves the multimedia device 105 transmitting the data signal to a client device 115 of the user using one of the network interface 305 and the display interface 310 as desired.

Figure 8:
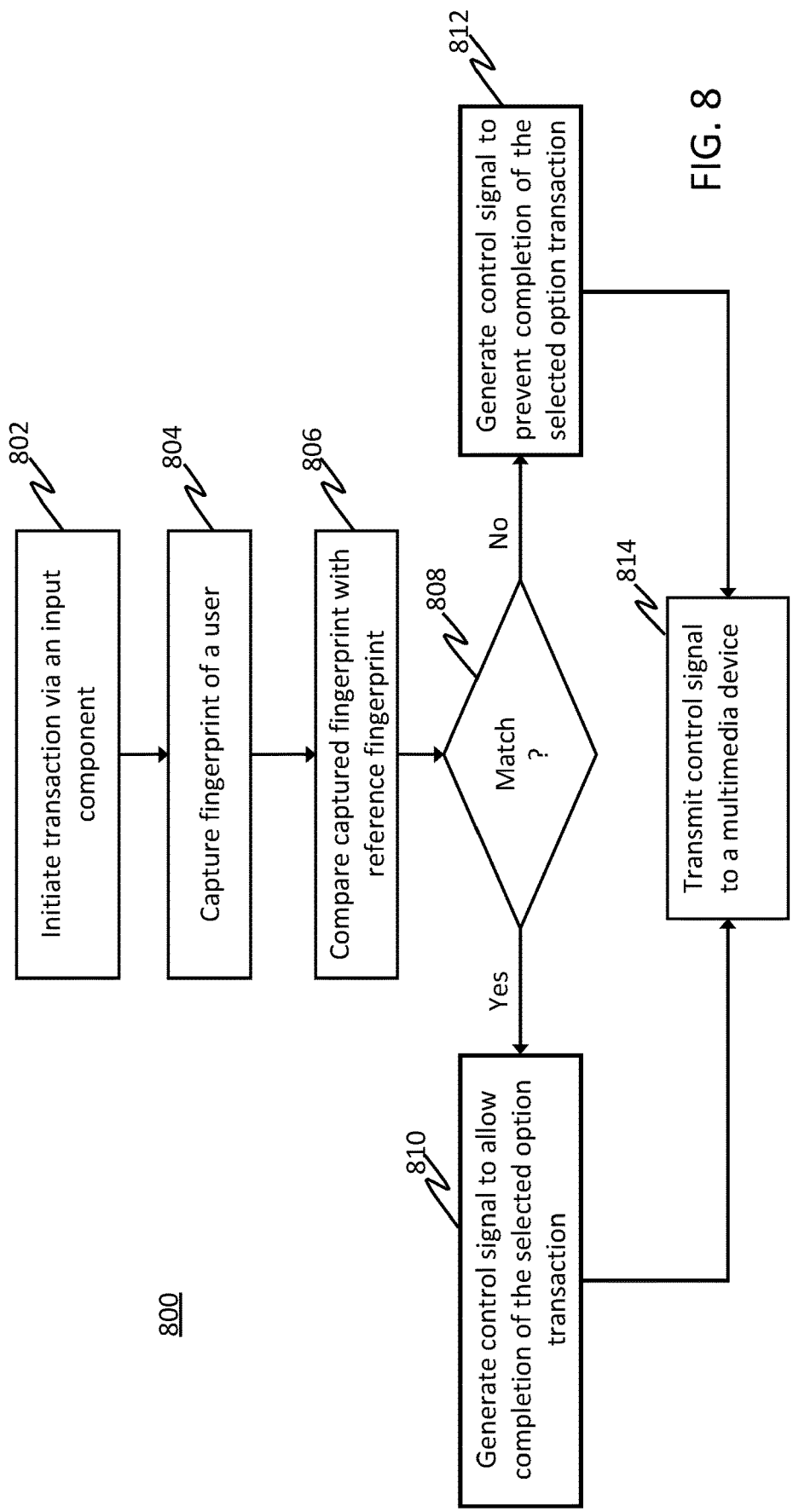
FIG. 8 is a flowchart illustrating a method for conducting a transaction via the RCU in accordance with an exemplary embodiment.

FIG. 8 is a flowchart illustrating a method 800 for conducting a transaction via the RCU in accordance with an exemplary embodiment.

As shown in FIG. 8, a user can be prompted to initiate or select a transaction via an input component 204 of the RCU 112, such as the keypad 204a or command buttons 204b (Step 802). The transaction can include but is not limited to initiating or confirming the purchase of an item or content viewable or being viewed on a selected channel, confirm participation in an online survey, or accept or decline the programming offers, programming changes, or subscription service agreements. It should be understood that the transaction can include any other activity which can be presented to the user via the multimedia device 105 and controlled, completed, or managed via the RCU 112. Once the transaction is selected the user can be prompted to have their fingerprint scanned via the fingerprint scanner of the RCU 112 (step 804). The RCU 112 can process the digital information of the captured fingerprint by comparing the fingerprint information to reference fingerprint data stored in memory 206 (step 806). Based on the comparison, the RCU 112 can generates a control signal, which includes information validating or invalidating the selected transaction based on whether a match to the captured fingerprint information is found (step 808). If the control signal includes validating information, the multimedia device 105 can be instructed to allow completion of the selected transaction (step 810). If the control signal includes invalidating information indicating a match was not found, the multimedia device 105 can be instructed to stop or deny completion of the transaction (step 812). The RCU 112 sends the control signal to the multimedia device using a suitable communication protocol (e.g., RF, Bluetooth, WiFi, etc.) (step 814).

Figure 9:
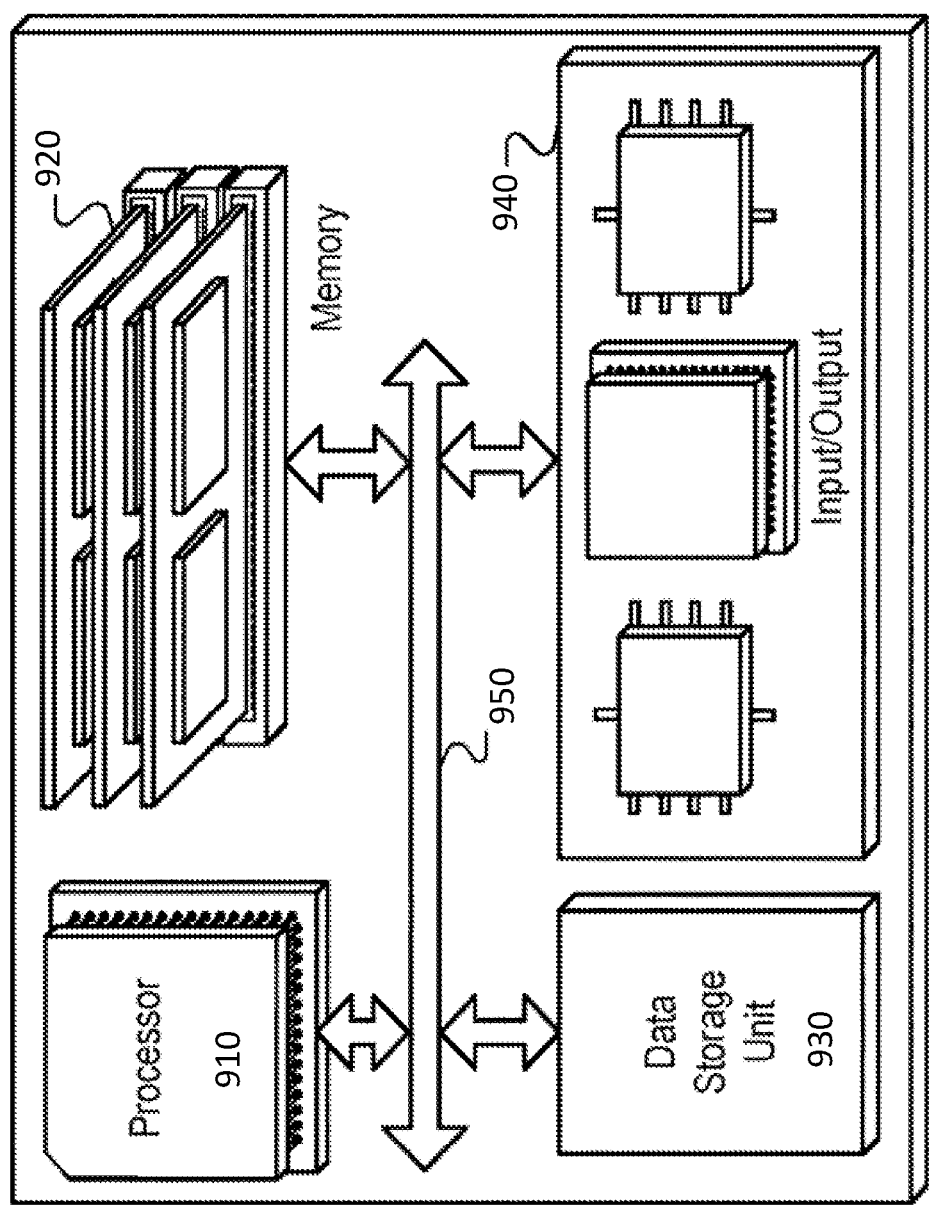
FIG. 9 is a block diagram of a hardware configuration operable to facilitate the generation and utilization of a custom user profile and complete a transaction in accordance with an exemplary embodiment of the present disclosure.

FIG. 9 is a block diagram of a hardware configuration 900 operable to facilitate the generation and utilization of a custom user profile and conduct a transaction in accordance with an exemplary embodiment of the present disclosure. The hardware configuration 900 can include a processor 910, a memory 920, a storage device 930, and an input/output device 940. Each of the components 910, 920, 930, and 940 can, for example, be interconnected using a system bus 950. The processor 910 can be capable of processing instructions for execution within the hardware configuration 800. In one implementation, the processor 910 can be a single-threaded processor. In another implementation, the processor 910 can be a multi-threaded processor. The processor 910 can be capable of processing instructions stored in the memory 920 or on the storage device 930.

The memory 920 can store information within the hardware configuration 800. In one implementation, the memory 920 can be a computer-readable medium. In one implementation, the memory 920 can be a volatile memory unit. In another implementation, the memory 920 can be a non-volatile memory unit.

In some implementations, the storage device 930 can be capable of providing mass storage for the hardware configuration 900. In one implementation, the storage device 930 can be a computer-readable medium. In various different implementations, the storage device 930 can, for example, include a hard disk device, an optical disk device, flash memory or some other large capacity storage device. In other implementations, the storage device 930 can be a device external to the hardware configuration 900.

The input/output device 940 provides input/output operations for the hardware configuration 800. In embodiments, the input/output device 940 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for outputting video and/or data services to a client device 115 of FIG. 1 (e.g., television, mobile device, tablet, computer, STB, etc.). In embodiments, the input/output device can include driver devices configured to send communications to, and receive communications from one or more networks (e.g., subscriber network 120 of FIG. 1, WAN 115 of FIG. 1, local network of FIG. 1, etc.).

According to exemplary embodiments the functional operations described herein can be provided in digital electronic circuitry, or in computer software, firmware, or hardware, including the structures disclosed in this specification and their structural equivalents, or in combinations of one or more of them. Some embodiments of the subject matter of this disclosure, and components thereof, can be realized by software instructions that upon execution cause one or more processing devices to carry out processes and functions described above. Further embodiments of the subject matter described in this specification can be implemented as one or more computer program products, i.e., one or more modules of computer program instructions encoded on a tangible program carrier for execution by, or to control the operation of, data processing apparatus.

One or more exemplary computer programs (also known as a program, software, software application, script, or code) for executing the functions of the exemplary embodiments disclosed herein, can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

In some embodiments, the processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be In some embodiments, an apparatus or device embodying the invention may be in the form of a gateway, an access point, a set-top box or other standalone device, or may be incorporated in a television or other content playing apparatus, or other device, and the scope of the present invention is not intended to be limited with respect to such forms.

Components of some embodiments may be implemented as Integrated Circuits (IC), Application-Specific Integrated Circuits (ASIC), or Large Scale Integrated circuits (LSI), system LSI, super LSI, or ultra LSI components. Each of the processing units can be many single-function components, or can be one component integrated using the technologies described above. Components may also be implemented as a specifically programmed general purpose processor, CPU, a specialized microprocessor such as Digital Signal Processor that can be directed by program instructions, a Field Programmable Gate Array (FPGA) that can be programmed after manufacturing, or a reconfigurable processor. Some or all of the functions may be implemented by such a processor while some or all of the functions may be implemented by circuitry in any of the forms discussed above.

It is also contemplated that implementations and components of embodiments can be done with any newly arising technology that may replace any of the above implementation technologies.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, where operations are depicted in the drawings in a particular order, this should not be understood as requiring that such operations be performed in the particular order shown or in sequential order unless otherwise noted, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

While the preceding discussion used Wi-Fi and/or Ethernet communication protocols as illustrative examples, in other embodiments a wide variety of communication protocols and, more generally, adaptive balancing techniques may be used. Thus, the adaptive balancing technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the adaptive balancing technique may be implemented using program instructions, operating system (such as a driver for interface circuit) or in firmware in an interface circuit. Alternatively or additionally, at least some of the operations in the adaptive balancing technique may be implemented in a physical layer, such as hardware in an interface circuit.

In the preceding description, we refer to 'some embodiments.' Note that 'some embodiments' describes a subset of all of the possible embodiments, but does not always specify the same subset of embodiments. Moreover, note that numerical values in the preceding embodiments are illustrative examples of some embodiments. In other embodiments of the communication technique, different numerical values may be used.

The foregoing description is intended to enable any person skilled in the art to make and use the disclosure and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

Having described the invention in detail, it will be understood that such detail need not be strictly adhered to, but that additional changes and modifications may suggest themselves to one skilled in the art.

What is claimed is:

1. A remote control device, comprising:
an input interface configured for capturing a fingerprint of a user;
memory for storing:
program code for controlling a specified content provider apparatus, and a plurality of user identification files, each user identification file including data associated with a reference fingerprint of a user, at least one of the plurality of user identification files including data associated with a plurality of reference fingerprints, each reference fingerprint being associated with a different finger of the user and a different control function or operation including: displaying a menu or interface for selecting content, displaying a menu or interface for selecting/setting hardware preferences, and initiating one or more functions or controls of the multimedia device;

a remote control processor configured to compare the captured fingerprint with at least one reference fingerprint stored in memory, the remote control processor executing the program code to generate a control signal based on a result of the comparison, wherein:

when the captured fingerprint matches the at least one reference fingerprint, the control signal includes at least a user profile identifier associated with the captured fingerprint and command data for instructing the multimedia device to generate a customized user interface for the identified user; and when the captured fingerprint does not match the at least one reference fingerprint, the control signal includes command data for instructing the multimedia device to generate a default user interface; and a remote control transmitter configured for transmitting the control signal to a multimedia device.

2. The device of claim 1, wherein the control signal includes instructions for generating a user interface customized according to at least one of viewing history and viewing preferences provided in the user profile of the identified user.

3. The device of claim 1, wherein the control signal includes instructions for generating a user interface which includes options for controlling display, audio, and playback options of the content provider apparatus.

4. The device of claim 1, wherein the program code includes an application program for controlling the multimedia device, and in executing the program code the remote control unit is a device dedicated for controlling the multimedia device.

5. The device of claim 1, comprising:
a control circuit which includes the processor.

6. The device of claim 5, wherein the program code includes firmware for generating commands to operate the control circuit, and in executing the program code the remote control unit is a device dedicated for controlling the multimedia device.

7. A multimedia device in combination with the remote control device of claim 1, the multimedia device, comprising:

a receiving device configured to wirelessly receive the control signal from the remote control device; and a multimedia processor configured to generate a data signal for displaying an interface on a client device, wherein when the received control signal includes a user profile identifier, the multimedia processor is further configured to:

generate a query for selecting a user profile associated with the user profile identifier, the user profile being stored in a memory device having storage locations accessible by the multimedia processor, the user profiled including data associated with a plurality of fingerprints, each fingerprint being associated with a different finger of the user and a different control function or operation including: displaying a menu or interface for selecting content, displaying a menu or interface for selecting/setting hardware preferences, and initiating one or more functions or controls of the multimedia device; and generate a data signal for displaying a customized interface based on at least one of the viewing history and the preference information provided in the selected user profile; and a transmitting device configured to transmit the data signal for displaying the interface to the client device of the identified user.

8. The multimedia device of claim 7, wherein:
if the control signal includes command data for generating a default user interface, the processor is further configured to:

obtain at least one of the viewing history and the preference information provided in one or more selected user profiles associated with a subscriber account; and generate a data signal for displaying the default interface based on at least one of the obtained viewing history and the preference information of the one or more selected user profiles; and the transmitting device is further configured to transmit to a client device, the data signal for displaying the default interface.

9. The multimedia device of claim 7, wherein the processor is configured to select one or more advertisements for output to a client device based on at least one of the viewing history and the preference information provided in the selected user profile of the identified user.

10. The multimedia device of claim 7, wherein the query is sent to a cloud database.

11. The multimedia device of claim 10, wherein the cloud database stores a plurality of user profiles, wherein each user profile is associated with a specified user.

12. The multimedia device of claim 11, wherein the processor is configured to execute a neural network for learning a viewing and usage behavior of the specified user.

13. The multimedia device of claim 11, wherein one of the plurality of user profiles is an administrative profile, the administrative profile having permissions to control configurable parameters of the multimedia device.

14. The multimedia device of claim 13, wherein the administrative profile has permissions to set controls for other user profiles.

15. A method for generating a customized user interface, comprising:

storing, in memory of a remote control unit, a plurality of user identification files, wherein at least one of the plurality of user identification files includes data associated with a plurality reference fingerprints, each reference fingerprint being associated with a different finger and a different control function or operation generated by the remote control processor including displaying a menu or interface for selecting content, displaying a menu or interface for selecting/setting hardware preferences, and initiating one or more functions or controls of the multimedia device;

executing, by a processing device of the remote control unit, program code dedicated for controlling a specified multimedia device;

capturing, via a fingerprint scanner of a remote control unit, a fingerprint of a user;

comparing, by a processing device of the remote control unit, the captured fingerprint with at least one reference fingerprint stored in the memory;

generating, by the processing device of the remote control unit, a control signal based on the executed program code and as a result of the comparison, wherein:
  when the captured fingerprint matches the at least one reference fingerprint, the control signal includes at least a user profile identifier associated with the captured fingerprint and command data for instructing the multimedia device to generate a customized user interface for the identified user; and
  when the captured fingerprint does not match the at least one reference fingerprint, the control signal includes command data for instructing the multimedia device to generate a default user interface; and
transmitting, via a transmitting device of the remote control unit, the control signal to a multimedia device.

16. The method according to claim 15, comprising:
receiving, in a receiving unit of the specified multimedia device, the control signal from the control unit;
determining, in a processor of the multimedia device, whether the control signal includes a user profile identifier;
if the control signal includes a user profile identifier:
  generating, in the processor of the multimedia device, a first query for selecting a user profile associated with the user profile identifier;
  generating, in the processor of the multimedia device, a data signal for displaying a customized interface based on at least one of the viewing history and the preference information provided in the selected user profile; and
  transmitting, by a transmitting device of the multimedia device, the data signal for displaying the customized interface on a display device of a user associated with the selected user profile.

17. The method according to claim 16, further comprising:
identifying, in the processor of the multimedia device, one or more advertisements to display to the user based on at least one of the viewing history and the preference information provided in the user profile of the identified user.

18. The method of claim 16, wherein the processor is configured to execute a neural network for learning a viewing and usage behavior of the specified user.

19. The method of claim 16, comprising:
storing, in a memory device of a control unit, one or more user identification files, the user identification file including a reference fingerprint of a user.

20. The method of claim 16, wherein:
if the control signal includes command data for generating a default user interface:
  obtaining, in the processor of the multimedia device, at least one of the viewing history and the preference information provided in one or more user profiles associated with a subscriber account;
  generating, in the processor of the multimedia device, a data signal for displaying the default user interface based the obtained viewing history and preference information provided in the one or more user profiles; and
  transmitting, by a transmitting device of the multimedia device, the data signal for displaying the default user interface to a client device.

21. The method of claim 16, wherein the data signal includes instructions for generating a user interface which includes options for controlling at least one of a display output, an audio output, and playback options of the multimedia device.

22. The method of claim 15, wherein the program code includes an application program, and in executing the program code the remote control unit is a device dedicated for controlling the multimedia device.

23. The method of claim 15, wherein the program code includes firmware for controlling an output of a control circuit, and in executing the program code the remote control unit is a device dedicated for controlling the multimedia device.

24. The device of claim 1, wherein the different control function or operation includes: device power, volume control, and trickplay operations.

25. The device of claim 1, wherein a first one of the reference fingerprints of one of the plurality of user identification files is associated with a first user profile and a second one of the reference fingerprints of the one of the plurality of user identification files is associated with a second user profile.

* * * * *